United States Patent [19]

Lim et al.

[11] Patent Number: 4,563,671

[45] Date of Patent: Jan. 7, 1986

[54] CODING TECHNIQUE

[75] Inventors: Tong L. Lim, Middletown; Arun N. Netravali, Westfield, both of N.J.

[73] Assignee: AT&T Bell Laboratories, Murray Hill, N.J.

[21] Appl. No.: 495,707

[22] Filed: May 18, 1983

[51] Int. Cl.$^4$ ............................................. H04N 7/12
[52] U.S. Cl. ............................ 340/347 DD; 358/261; 375/122; 382/56
[58] Field of Search .................. 358/133, 261, 260; 340/347 DD; 375/122; 382/56

[56] References Cited

U.S. PATENT DOCUMENTS

| | | | |
|---|---|---|---|
| 4,185,302 | 1/1980 | Mounts et al. | 358/261 |
| 4,409,623 | 10/1983 | Kobayashi et al. | 358/261 |
| 4,476,495 | 10/1984 | Fujisawa et al. | 358/261 |

OTHER PUBLICATIONS

"Standardization of Group 3 Facsimile Apparatus for Document Transmission," *CCITT Recommendation*, 1981, pp. 222–235.

*Primary Examiner*—Clifford C. Shaw
*Attorney, Agent, or Firm*—Ronald D. Slusky

[57] ABSTRACT

In a transmitter for image signals, a variable-length coder whose code set has been optimized for the order statistics of a run-length-coded bilevel image is used to code a stream of differential-pulse-code-modulated (DPCM) errors representing a multi-level image. The DPCM errors are first rearranged on a line-by-line basis in such a way that the rearranged error stream contains many long runs. Individual words in the rearranged error stream are then changed in such a way that, for at least one value of n, the n most-frequently-occurring words in the resulting, processed signal substantially have the aforementioned order statistics. The resulting signal is then run-length-coded, applied to the variable-length coder, and then transmitted. The reverse processing is performed at the receiver.

36 Claims, 3 Drawing Figures

FIG. 3

DPCM ERROR MAP

|  | COLUMNS | | | | | | |
|---|---|---|---|---|---|---|---|
|  | 1 | 2 | 3 | 4 | --------- | 1719 | 1720 |
| 1 | $e_{1,1}$ | $e_{1,2}$ | $e_{1,3}$ | $e_{1,4}$ | ------ | $e_{1,1719}$ | $e_{1,1720}$ |
| 2 | $e_{2,1}$ | $e_{2,2}$ | $e_{2,3}$ | $e_{2,4}$ | ------ | $e_{2,1719}$ | $e_{2,1720}$ |
| 3 | $e_{3,1}$ | $e_{3,2}$ | $e_{3,3}$ | $e_{3,4}$ | ------ | $e_{3,1719}$ | $e_{3,1720}$ |
| 4 | $e_{4,1}$ | $e_{4,2}$ | $e_{4,3}$ | $e_{4,4}$ | ------ | $e_{4,1719}$ | $e_{4,1720}$ |

ROWS

REORDERED ERROR STREAM FOR ROW 4

$e_{4,2}$   $e_{4,3}$   $e_{4,4}$ ---- $e_{4,1720}$   $e_{4,1719}$ ---- $e_{4,5}$   $e_{4,1}$

|←——— PREDICTED ZEROS ———|——— PREDICTED NON ZEROS ———→|

CODING TECHNIQUE

BACKGROUND OF THE INVENTION

The present invention relates to signal coding.

The coding of a digital signal often includes a step which takes into account the order statistics of the words comprising the signal, the "order statistics" being the order of the frequency of occurrence of those words. Perhaps the most well known of such coding schemes is variable-length coding wherein the frequency with which a particular signal word is expected to occur vis-a-vis the frequency with which the other signal words are expected to occur determines the length of the codeword to which that signal word is assigned; the greater the expected frequency of occurrence, the shorter the codeword.

One approach for carrying out a variable-length or other coding scheme of this type is to explicitly determine the order statistics of the words to be coded before performing the coding itself. Such an approach is advantageous in that the codeword assignment scheme is assured to be optimal for the particular signal being coded. However, a table or "dictionary" setting forth the codeword assignment scheme must be created for each coded signal, thereby, for example, increasing the amount of information to be transmitted and/or stored in order to recreate the signal.

An alternative approach is to generate the codeword set based on an analysis of the order statistics of a representative set of signals in a particular, fairly narrow category, e.g., run-length-coded bilevel images. The variable-length or other code is then created on the basis of that analysis. In this way, the order statistics of the signal actually applied to the coder is likely to be very close to the order statistics with which the coder was designed. At the same time, however, the coder will only efficiently code signals having those order statistics.

SUMMARY OF THE INVENTION

In accordance with the present invention, a signal comprised of words which have one set of order statistics is adapted to be efficiently coded by a coder, such as a variable-length coder, whose code set has been optimized for an assumed, different set of order statistics, by changing at least one of the words in the signal to be coded in such a way that, for at least one value of n, the n most-frequently-occurring words in the resulting, processed signal substantially have said assumed order statistics. The signal thus processed is then applied to the coder. Alternatively stated, at least ones of the words in a signal whose n most-frequently-occurring words are different from what the coder assumes will be the n most-frequently-occurring words are changed such that the n most-frequently-occurring words in the resulting signal are the same as those assumed.

Advantageously, this approach enables the use of the same coder to code signals having different sets of order statistics. In the present illustrative embodiment, for example, signals representing differential-pulse-code-modulated multi-level images are processed in accordance with the invention so as to be efficiently coded by a variable-length coder whose code set is optimized for run-length-coded bilevel images.

BRIEF DESCRIPTION OF THE DRAWING

FIG. 3 shows how a differential-pulse-code-modulated error stream is reordered in the transmitter of FIG. 1.

DETAILED DESCRIPTION

The transmitter of FIG. 1 and receiver of FIG. 2 will first be described in overview in order to explain the functions of their various components and, at the same time, to explain the principles of the present invention. The structure of, and the processing performed by, those various components will then be discussed in greater detail.

Figure 1:
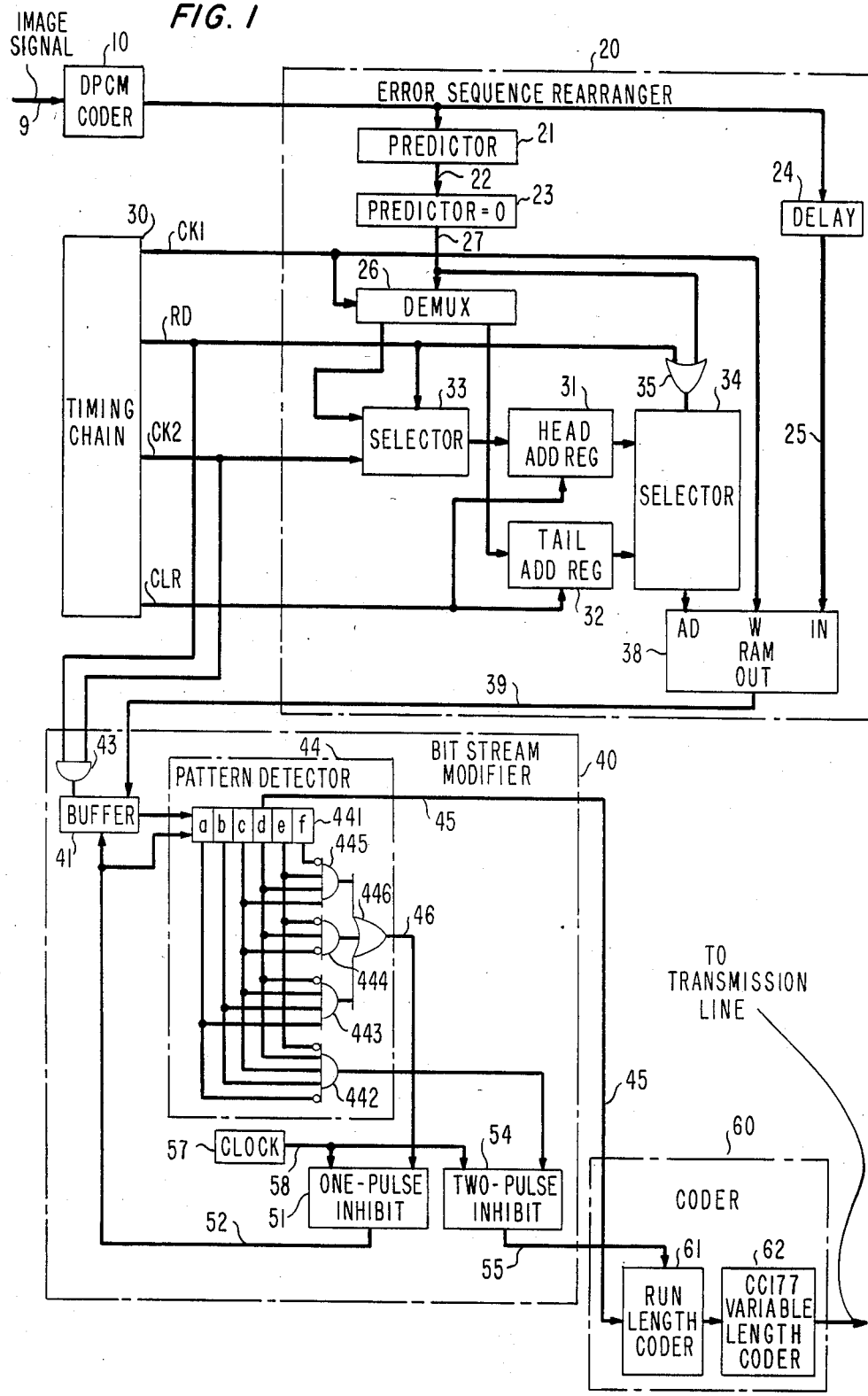
FIG. 1 depicts a data transmitter which codes signals in accordance with the principles of the invention.

In particular, the transmitter of FIG. 1 receives on lead 9 an image signal representing the quantized values of the picture elements of a scanned image. The image signal may have been generated, for example, by a conventional video scanner/quantizer arrangement (not shown). Within the transmitter, the image signal is applied to a differential pulse code modulation (DPCM) coder 10. As is conventional, the output of coder 10 is a stream of DPCM errors which, in this example, can take on one of seven values, represented by the seven 3-bit words 111, 110, 010, 000, 001, 100 and 101.

Ultimately, the bit stream representing the DPCM errors is to be, inter alia, run-length-coded by a coder 60. In order to enhance the efficiency of the run-length-coding process, the DPCM errors are first applied to error sequence rearranger 20, which, as will be described, rearranges the DPCM errors, on a line-by-line basis, in such a way that the rearranged error stream contains many long runs—principally, in this example, long runs of 0's.

In accordance with the present invention, the output bit stream of error sequence rearranger 20 is modified by bit stream modifier 40 before passing to coder 60. Prior to discussing bit stream modifier 40, however, it is convenient to describe coder 60 in further detail.

Coder 60 includes not only a run-length coder 61, which computes the run lengths, as mentioned above, but also a variable-length coder 62, which thereafter codes the words representing the run lengths using a variable-length coding scheme. As is conventional, a particular order statistics, i.e., a particular order of frequency of occurrence, for the words to be coded is assumed by the coder. In particular, the variable-length coding scheme is that described in CCITT Recommendation "Standardization of Group 3 Facsimile Apparatus for Document Transmission," Vol. VII, Fascicle VII.2, Rec. T.4. As is reported, for example, in R. Hunter et al, "International Digital Facsimile Coding Standards," Proc. IEEE, Vol. 68, No. 7, July 1980, pp. 854-867, this code was constructed by analyzing the lengths of the runs of 0s and 1s in eight "typical" bilevel images. Two variable-length code sets were then created—one for white ("0") runs and one for black ("1") runs, with the shortest codewords in each code set being assigned to the run lengths which occur most frequently.

As previously noted, the image signal applied to the transmitter of FIG. 1 is a multi-level, rather than bi-level, image. Thus the order statistics of the words, i.e., the runs of 0s and 1s, in the bit stream at the output of rearranger 20 will not, in general, be the same as the order statistics assumed by the coder. That is, the n most-frequently-occurring words in the bit stream will, in general, be different from the n words that the coder assumes will be the most frequently occurring, for at least one value of n. Thus, if the rearranged bit stream at the output of rearranger 20 were applied to coder 60 directly, the efficiency of the coding would be less than optimal. It is nonetheless desirable to be able to use the same coder for both bilevel and multi-level images.

It is to this end that, in accordance with the present invention, bit stream modifier 40 is provided. This unit adds bits to, and deletes bits from, the bit stream put out by rearranger 20, thereby changing at least ones of the words, or runs, therein, in such a way that for at least one value of n, the order statistics of the n most-frequently-occurring words in the resulting, processed signal substantially have the order statistics assumed by the coder. The coding of the multilevel image signal is thus substantially as efficient as it would be if the variable-length code employed by coder 60 were constructed on the basis of the order statistics of the words in the unmodified bit stream.

Figure 2:
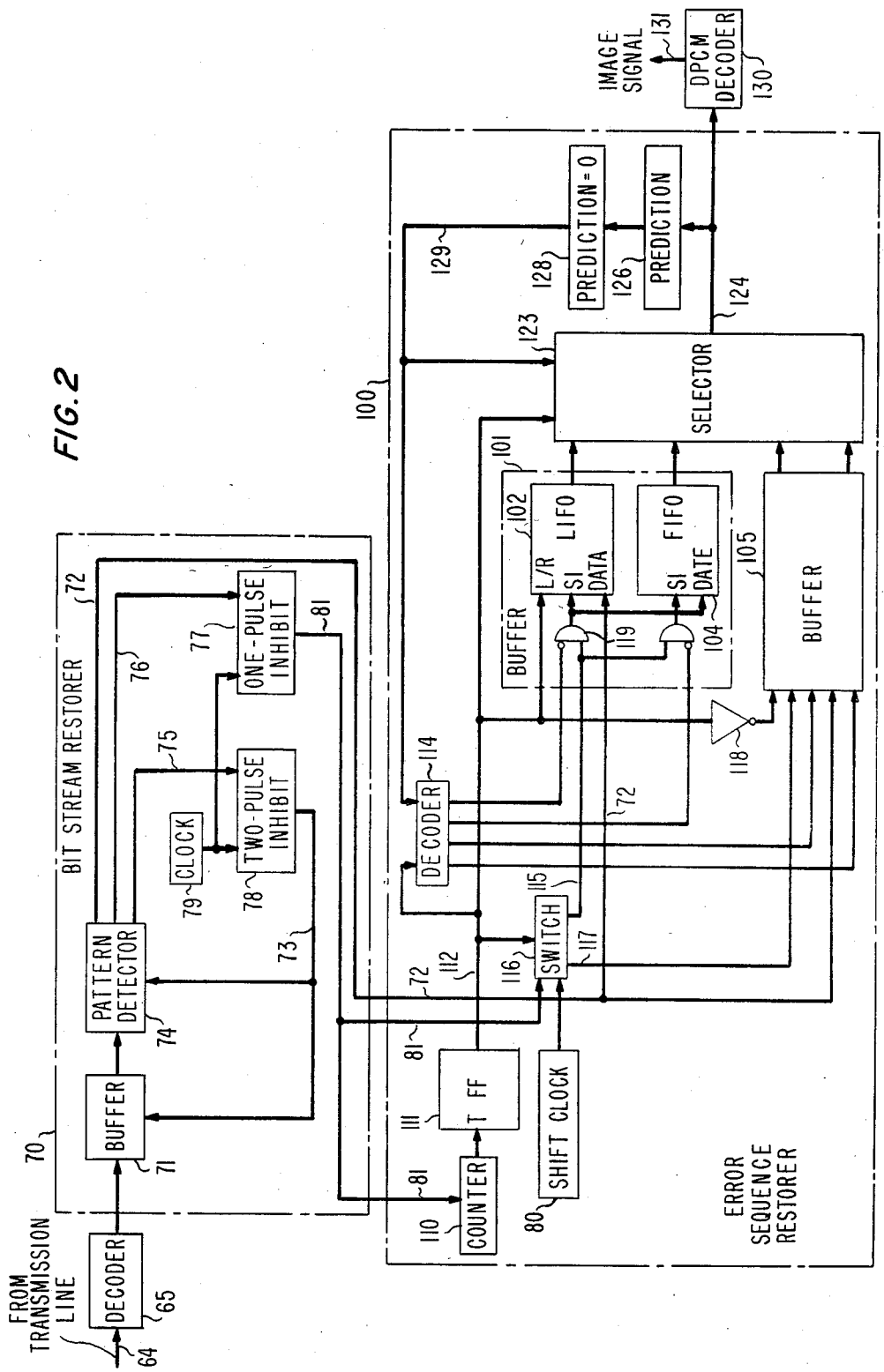
FIG. 2 depicts a data receiver in which the signals coded by the transmitter of FIG. 1 are decoded.

The receiver of FIG. 2 reverses the processing performed in the transmitter. In particular, the coded signal received from the transmission line via lead 64 is first applied to decoder 65 which (a) converts the variable-length code words applied to it back into words representing the run lengths of 0s and 1s and then (b) reconstructs, from the latter words, the bit stream itself. The bit stream put out by decoder 65 is applied to bit stream restorer 70, which deletes (inserts) any bits inserted (deleted) by bit stream modifier 40 in the transmitter. The output of restorer 70 is then applied to error sequence restorer 100, which restores the DPCM errors to their original order, thereby reversing the processing performed by error sequence rearranger 20 in the transmitter. And finally the DPCM errors are processed by DPCM decoder 130 to reconstruct, on lead 131, the original image signal.

Returning to FIG. 1, the structure and operation of error sequence rearranger 20 and bit stream modifier 40 in the transmitter will now be described.

Error sequence rearranger 20, in particular, upon receiving each DPCM error provided to it by coder 10, (a) predicts whether or not the next error will be zero (represented by the word 000) and (b) rearranges the order of the errors in a given line in such a way that all the errors that were predicted to be zero—whether or not they actually were zero—are grouped together. In general, the DPCM error stream will in fact include many zeros. Thus the rearranged error stream will contain many long runs of zeros, as desired. (The reason that the errors are grouped on the basis of their predicted values, rather than their actual values, is so that the error sequence restorer 100 in the receiver, by using the same prediction algorithm, will be able to reconstruct the original error sequence, as is discussed below.)

The prediction and rearranging performed by rearranger 20 is illustrated in FIG. 3. In particular, FIG. 3 depicts a map of DPCM errors of a DPCM-coded image. The error associated with the picture element (pel) in the $i^{th}$ row (line) and $j^{th}$ column is denoted $e_{i,j}$. The value of error $e_{i,j}$ is predicted as a function of the values of the four neighboring errors $e_{i,j-1}$, $e_{i-1,j-1}$, $e_{i-1,j}$ and $e_{i-1,j+1}$, i.e., the neighbor immediately to the left in the same row and the three closest neighbors in the previous row. Thus, for example, the neighbors used to predict the value of error $e_{4,3}$ are errors $e_{4,2}$, $e_{3,2}$, $e_{3,3}$, and $e_{3,4}$. If at least three of the four neighbors are "0", then the error in question is predicted also to be zero. Otherwise it is predicted to be non-zero.

An example of how the errors are rearranged is also shown in FIG. 3—illustratively for row 4. The errors $e_{4,2}$, $e_{4,3}$, $e_{4,4}$ . . . $e_{4,1720}$ were all predicted to be zero and are placed at the head of the rearranged error stream. All the other errors, viz., $e_{4,1}$, $e_{4,5}$, . . . $e_{4,1719}$ are placed at the end of the rearranged error stream. The latter errors, however, appear in the rearranged error stream in reverse order. That is, the first error in row 4 that was predicted to be non-zero—error $e_{4,1}$—appears in the rearranged error stream as the last such error, while the last error in the 4th row that was predicted to be non-zero—error $e_{4,1719}$—appears in the rearranged error stream as the first such error, i.e., immediately following the errors that were predicted to be zero. Again, this is done to facilitate restoral of the original error sequence in the receiver, as will be seen.

Turning, then, to the structure of rearranger 20, we see that the DPCM errors generated by coder 10 are applied within rearranger 20 to predictor 21, which is of conventional design and which provides the predicted error values on its output lead 22. These pass to a comparator 23 which provides a "1" on its output lead 27 if the predicted error value is zero. Lead 27, in turn, extends to the control input of a demultiplexer 26.

The DPCM error stream itself, delayed in delay unit 24 by an amount equal to the processing delay in predictor 21 and comparator 23, is applied to a random access memory (RAM) 38, via lead 25. RAM 38 receives its write pulses from transmitter timing chain 30 via lead CK1 and its addresses from a selector 34. (Timing chain 30 provides numerous timing signals to various components of the transmitter. However, only those of particular interest are shown in the drawing and described herein.) Selector 34, in turn, selects an address from one or the other of two registers—head address register 31 and tail address register 32—as a function of the signal on lead 27, which is applied to selector 34 via OR gate 35. Register 31 (32) holds the address of the location in RAM 38 which is adjacent to the most-recently-written error that was a predicted zero (non-zero). If the signal on lead 27 indicates that the DPCM error currently being applied to RAM 38 is a predicted zero (non-zero), selector 34 applies the address in register 31 (32) to the RAM, thereby achieving the reordering described above in conjunction with FIG. 3.

The pulses on lead CK1 are also applied to the data input of multiplexer 26. If the signal on lead 27 indicates that the DPCM error currently being applied to RAM 38 is a predicted zero, demultiplexer 26 applies the next clock pulse on lead CK1 to head address register 31 via a selector 33, the latter being so configured at this time to provide that function in response to a control signal on lead RD. Register 31 responds to the lead CK1 pulse by incrementing the address stored therein so as to have ready the address of the location into which the next predicted zero error is to be placed. Similarly, if the signal on lead 27 indicates that the DPCM error currently being applied to RAM 38 is a predicted non-zero, demultiplexer 26 applies the next clock pulse on lead CK1 to tail address register 32. The latter responds by decrementing the address stored therein so as to have ready the address of the location into which the next predicted non-zero error is to be placed.

After the last DPCM error for a given line has been written into RAM 38, the entire now-reordered line of errors is read out of RAM 38 and onto lead 39 prior to the appearance on lead 25 of the first error of the next line. This is accomplished by causing the addresses of all the locations in the RAM to be generated in rapid succession within register 31, and applied to the RAM via selector 34. To accomplish this, timing chain 30 first clears register 31 via a pulse on lead CLR. (Register 32 is also cleared by that pulse although its contents are not used at this time.) In addition, timing chain 30 changes the state of lead RD. Selector 33 responds to the change of state on lead RD by applying to register 31 a high speed clocking signal provided by timing chain 30 on lead CK2. This causes the above-mentioned address sequence to be generated. The signal on lead RD also extends to selector 34 via OR gate 35 so that selector 34 is operated to provide the addresses generated in register 31 to RAM 38. Finally, the signal on lead RD also gates the high-speed clock signal on lead CK2 via AND gate 43 to a buffer 41 within bit stream modifier 40, whereby the errors being read out of RAM 38 onto lead 39 are written into that buffer. Registers 31 and 32 are then again cleared via a pulse on lead CLR in preparation for the next line of errors.

Turning now to bit stream modifier 40, we first describe the processing performed thereby in accordance with the invention.

A typical frequency of occurrence of words, or runs, of a given length (either runs of "0"s or runs of "1"s) in the rearranged bit stream on lead 39 is as follows:

| Run Length | Frequency Occurrence |
| --- | --- |
| 1 | .40 |
| 2 | .29 |
| 3 | .20 |
| 4 | .04 |
| 5 | .04 |
| 6 | .01 |
| 7 | .01 |
| 8 | .002 |
| 9 | .002 |

Note that the frequency of occurrence is a monotonic function of run length. That is, the shorter the run, the greater of its frequency of occurrence. An efficient code for such a statistical distribution would thus assign the shortest code words to the shortest run lengths. This criterion, however, is not met by the CCITT code used by variable-length coder 62, as can be seen from the following listing of that code for runs of length 1-9:

| Run Length | Codewords | |
| --- | --- | --- |
| | white ("0") runs | black ("1") runs |
| 1 | 000111 | 010 |
| 2 | 0111 | 11 |
| 3 | 1000 | 10 |
| 4 | 1011 | 011 |
| 5 | 1100 | 0011 |
| 6 | 1110 | 0010 |
| 7 | 1111 | 00011 |
| 8 | 10011 | 000101 |
| 9 | 10100 | 000100 |

Note, in particular, that the shortest white run length, i.e., a white run of length 1, is assigned a codeword in the white run code set which is comprised of six bits while runs which are longer are assigned to shorter, viz., 4- and 5-bit, codewords in that code set. In addition, the shortest black run length is assigned a codeword in the block run code set which is comprised of three bits, while runs which are longer, namely runs comprised of 2 or 3 bits, are assigned shorter, viz., 2-bit, codewords in that code set.

As previously noted, bit stream modifier 40, in accordance with the invention, adds bits to, and deletes bits from, the bit stream put out by rearranger 20 in such a way that, for at least one value of n, the order statistics of the n most-frequently-occurring runs of "0"s and "1"s in the modified bit stream matches the order statistics that was used in constructing the code used by coder 62. In particular, bit stream modifier 40 makes the following modifications to the bit stream on lead 39:

(a) Add a "0" to each run of "0"s;
(b) Add a "1" to each one- and two-bit run of "1"s;
(c) Delete two "1" from each three-bit run of "1"s.

The result of these modifications is that (a) each run of "0"s is lengthened by one bit, (b) the one- and two-bit runs of "1"s respectively become two- and three-bit runs of "1"s, and (c) each three-bit run of "1"s becomes a one-bit run of "1"s. The overall result, then, is the following codeword assignment scheme for runs of length 1-9 occurring in the bit stream on lead 39.

| Run Length | Codewords | |
| --- | --- | --- |
| | white ("0") runs | black ("1") runs |
| 1 | 0111 | 11 |
| 2 | 1000 | 10 |
| 3 | 1011 | 010 |
| 4 | 1100 | 011 |
| 5 | 1110 | 0011 |
| 6 | 1111 | 0010 |
| 7 | 10011 | 00011 |
| 8 | 10100 | 000101 |
| 9 | 00111 | 000100 |

Note that, for at least n=9, the n most-frequently-occurring run lengths are now assigned, as desired, to the shortest codewords, in both the white and black code sets. Indeed, it would be satisfactory in this case to assure only that the n=3 most-frequently-occurring run lengths are assigned to the shortest codewords, given the very small frequency of occurrence of runs of length $\geq 4$.

Within bit stream modifier 40 itself, the bit stream on lead 39 is clocked from buffer 41 into a pattern detector 44—which includes a shift register 441 having six stages a through f—and thence to coder 60 via lead 45. In particular, the bits in buffer 41 are clocked out of buffer 41 and into shift register 441 in response to pulses from a clock 57. Those pulses are provided—in general, uninterruptedly—to buffer 41 and shift register 441 via lead 58, one-pulse-inhibit circuit 51 and lead 52. At the same time, the pulses from clock 57 are provided—in general, uninterruptedly—to run length coder 61 within coder 60 via lead 58, two-pulse-inhibit circuit 54 and lead 55, thereby causing the latter to read in each bit of the bit stream as the individual bits thereof sequentially appear in stage d of the shift register. The frequency of the pulses generated by clock 57 is greater than those on lead CK2. This is to prevent buffer 41 from filling up, and ultimately overflowing, as a result of the blocking of clock pulses by circuit 51, as described below.

Whenever the last bit of a run of "0"s reaches stage d, the output of AND gate 443 goes high because stage c holds a "1" at that time and the "0" in stage d is inverted as it is input to that gate. Thus the output of OR gate 446 on lead 46 goes high. This causes one-pulse-inhibit circuit 51 to block the next clock pulse on led 58 from reaching lead 52. The contents of shift register 441 are thus frozen for one clock pulse time. Coder 60 receives that next clock pulse, however, because, at this time, no pulses are being inhibited by two-pulse-inhibit circuit 54. Thus the "0" in stage d is clocked into coder 60 a second time, thereby adding an additional "0" into the run, as desired.

In addition, whenever a run comprised of a single "1" reaches stage d, the output of AND gate 444 goes high because the "0"s then stored in stages c and e are inverted as they are input to that gate. Similarly, the output of AND gate 445 goes high whenever the last bit of a run comprised of two "1"s reaches stage d. The outputs of gates 444 and 445 each also extend to OR gate 446 so that, as before, the bit currently stored in stage d—in this case, a "1"—is clocked into coder 60 a second time, thereby adding an additional "1" into each such run, as desired.

Finally, whenever the first bit of a run comprised of three "1"s reaches stage d, the output of AND gate 442 on lead 47 goes high. This causes two-pulse-inhibit circuit 54 to block the next two clock pulses on lead 58 from reaching lead 55. Thus, the next two bits in shift register 441 will shift through stage d without coder 60 being pulsed to read in those bits. As desired, then, each three-bit run of "1"s applied to bit stream modifier 40 becomes a one-bit run of "1"s at the input of coder 60.

Returning to FIG. 2, the structure and operation of bit stream restorer 70 and error sequence restorer 100 in the receiver will now be described.

Bit stream restorer 70, in particular, is structured and operates very similarly to bit stream modifier 40 in the transmitter. Indeed, bit stream restorer 70 includes a buffer 71, pattern detector 74, one- and two-pulse-inhibit circuits 77 and 78, respectively, and clock 79, all of which are similar to the like elements in bit stream modifier 40. There are some differences, however. In particular, the functions of the one- and two-pulse inhibit circuits are interchanged, so that buffer 71 and pattern detector 74 receive their clock pulses, on lead 73, via two-pulse inhibit circuit 78 while error sequence restorer 100, into which the bits from pattern detector 74 are clocked, receives its clock pulses, on lead 81, via one-pulse-inhibit circuit 77.

Moreover, the boolean logic arrangement in pattern detector 74 is somewhat different from that in pattern detector 44. In particular, pattern detector 74 signals one-pulse inhibit circuit 77, on lead 76, whenever the pattern detector detects the end of (a) a run of "0"s, (b) a run of two "1"s or (c) a run of three "1"s. This inhibits one of the clock 79 pulses from reaching lead 81, with the result that one bit of each such run passes through the shift register in pattern detector 74 without being clocked into error sequence restorer 80. In this way, the additional bit inserted into each such run by bit stream modifier 40 is removed. In addition, pattern detector 74 signals two-pulse inhibit circuit 78, on lead 75, whenever the pattern detector detects a run comprised of a single "1". This inhibits two of the clock 79 pulses from reaching lead 73, with the result that that single "1" is clocked into error sequence restorer 80 two additional times In this way, the two bits removed from each three-bit run of "1"s by bit stream modifier 40 are reinserted.

As previously noted, error sequence restorer 100 restores the DPCM errors to their original order, thereby reversing the processing performed by error sequence rearranger 20 in the transmitter. In particular, error sequence restorer 80 includes two buffers, 101 and 105, each of which includes a last-in/first-out (LIFO) shift register and first-in/first-out (FIFO) shift register. In summary, as the DPCM errors associated with a particular line of the image arrive on lead 72, they are concurrently stored in both of the shift registers in a particular one of the two buffers—hereinafter referred to as the inputting buffer. To this end, the two shift registers of the inputting buffer receive regularly-spaced pulses from a shift clock 80—which may actually be part of the receiver timing chain (not shown)—via a switch 116, one of switch 116 output leads 117 and 119, and respective ones; of AND gates 119, as described more fully below. At the same time, the errors associated with the previous line of DPCM errors, which were previously stored in the other of the two buffers—hereinafter referred to as the outputting buffer—are read out from that buffer in the proper order and applied to DPCM decoder 130 via selector 123 and lead 124.

Assume, for example, that buffer 101 is currently the outputting buffer. Assume further that the next error to be read out of buffer 101 and applied to DPCM decoder 130 is one that was predicted in the transmitter to be a zero (determined as described below). In this case, a shift pulse is to be applied to FIFO shift register 104 within buffer 101. Since the predicted zeros were placed at the head of the rearranged error sequence by rearranger 20, this causes the next error that was predicted to be zero to be read from buffer 101, as desired. If, on the other hand, the next error to be applied to DPCM decoder 95 is one that was predicted in the transmitter to be a non-zero, a shift pulse is to be applied to LIFO shift register 102. Since the predicted non-zeros were placed at the tail of the rearranged error sequence by rearranger 20—and in reverse order—this causes the next error that was predicted to be non-zero to be read from the outputting buffer, as desired. Advantageously, this arrangement allows each line of errors to be reordered without having to determine the location of the dividing line between the predicted zeros and the predicted non-zeros.

In order to achieve the foregoing mode of operation, error sequence restorer 100 further includes counter 110, toggle flip-flop 111, decoder 114, predictor 126 and comparator 128. In operation, the state of flip-flop 111 at any given time determines which one of buffers 101 and 105 is the inputting buffer and which is the outputting buffer. To this end, flip-flop 111 responds to the output of counter 110. The latter counts the number of pulses on lead 81, of which there are a fixed number for each line. When the count in counter 110 equals that fixed number—thereby indicating that the first error of a new line is now appearing on lead 72—counter, 110 pulses flip-flop 111, thereby changing the flip-flop's state.

The output signal of flip-flop 111 on lead 112 is applied to switch 116 which receives pulse streams from two sources. One source is shift clock 80, the pulses from which are regularly spaced pulses which are to be applied to the shift registers of whichever is currently the inputting buffer. The other source of the pulses for switch 116 is lead 81, the pulses on which are to be applied to the one of the two shift registers within the outputting buffer which is to provide the next DPCM error to selector 123.

The two output leads 115 and 117 of switch 116 extend to buffers 101 and 105, respectively. When lead 112 carries a "0", buffers 101 and 105 are the outputting and inputting buffers, respectively, and, accordingly, switch 116 provides the pulses from clock 80 and lead 81 on leads 117 and 115, respectively. When lead 112 carries a "1", the roles of buffers 101 and 105—and thus the signals on leads 115 and 117—are reversed.

The signal on lead 112 is also used to control the operating mode of the LIFO registers within each buffer to tell it whether it should respond to each received shift pulse by shifting right—which it must do when data is being input to the register—or by shifting left—which it must do when data is being output from the register. To this end, lead 112 extends to the left/right (L/R) control input of register 102 within buffer 101 via a direct connection and to the corresponding control input of the LIFO register within buffer 105 via an inverter 118, thereby achieving complementary operation of those two registers.

The function of decoder 114 and AND gates 119 is to ensure that, in accordance with the above-described operation of the outputting buffer, only one of the two shift registers in the outputting buffer receives a shift pulse at any given time. To this end, decoder 114 has four output leads, each of which extends to the inhibit input of a respective one of the four AND gates 119, and, based on the combination of the values of the signals on leads 112 and 129, decoder 114 applies a signal on an appropriate one of its four output leads, thereby providing the desired shift-pulse-blocking function.

More particularly, the signal on lead 112 indicates to decoder 114 which of the two buffers is the outputting buffer, as already discussed, while the signal on lead 129 indicates whether the next DPCM error is a predicted zero or non-zero, and thus indicates which of the two registers within the outputting buffer is to be inhibited from receiving a shift pulse. The signal on lead 129, more specifically, is generated by the combination of predictor 126 and comparator 128, which are substantially identical to predictor 21 and comparator 23, respectively, in the transmitter. As shown in the drawing, predictor 126 receives its input from lead 124 and comparator 128 receives its input from predictor 126.

The signals on leads 112 and 129 also extend to selector 123, thereby indicating to the latter which of the four shift registers within buffers 101 and 105 it should take its current input from.

The foregoing merely illustrates the principles of the invention. For example, the processing in accordance with the invention need not be carried out by inserting individual bits into a serial bit stream, thereby changing the words, or runs, in that stream. Rather, for example, one could run-length-code the serial bit stream first, and then change ones of the run-length-coded words. Moreover, the invention is not limited to systems in which the signal to be transmitted is run-length-coded, nor, indeed, to systems in which the signals being processed represent images.

It is thus anticipated that those skilled in the art will be able to devise numerous arrangements which, although not explicitly shown or described herein, embody the principles of the invention as defined by the claims.

What is claimed is:

1. Apparatus for use in conjunction with a coder which utilizes at least a first code set that is optimized for an assumed frequency of occurrence of at least predetermined ones of a stream of words to be coded, said apparatus comprising, means for receiving a stream of words in which, for at least one value of n, the n most-frequently-occurring words in said received stream are different from the assumed n most-frequently-occurring words, means for changing at least ones of the words in said received stream in such a way that the n most-frequently-occurring words in the resulting stream are the same as said assumed n most-frequently-occurring words, and means for applying said resulting stream to said coder.

2. The invention of claim 1 wherein said code set is a set of variable length code words.

3. Apparatus for use in conjunction with a coder which utilizes at least a first code set that is optimized for an expected frequency of occurrence of at least predetermined ones of the words of a first type of image signal, said apparatus comprising, means for receiving a plurality of words representing a second type of image signal in which, for at least one value of n, the n most-frequently-occurring words in said received plurality are different from the words that are expected to be the n most-frequently-occurring, means for changing at least ones of the words in said received plurality in such a way that the n most-frequently-occurring words in the resulting plurality are the same as said words that are expected to be the n most-frequently-occurring, and means for applying said resulting plurality to said coder.

4. The invention of claim 3 wherein said first type of image signal is a signal representing a substantially bi-level image.

5. The invention of claim 4 wherein said first type of image signal is a run-length-coded signal.

6. The invention of claim 4 wherein said second type of image signal is a signal comprised of a plurality of words representing an image that has at least a first multilevel portion.

7. The invention of claim 6 wherein said second type of image signal is a differential pulse code modulated signal.

8. Apparatus for use in conjunction with a variable length coder of the type which, for at least one value of n, assigns n code words of a variable length code to respective ones of n coder input words that are expected to occur more frequently than at least one other of the coder input words, said apparatus comprising, means for receiving a plurality of words in which said one other of said words is expected to occur at least as frequently as at least one of said n expected words, means for changing said other of said words to be said at least one of said n expected words, and means for applying the resulting plurality of words to said coder.

9. The invention of claim 8 wherein said changing means performs said changing in such a way that the $i^{th}$ most-frequently-occurring word of said resulting plurality is the same as the expected $i^{th}$ most-frequently-occurring one of said n expected words for $i=1,\ldots,n$.

10. Apparatus for use in conjunction with a variable length coder of the type which, for at least one value of n, assigns n code words of a variable length code to respective ones of n words that are expected to occur more frequently than at least one other word in image signals of a first predetermined type, said apparatus comprising, means for receiving an image signal of a second predetermined type, said received image signal including a plurality of words in which said one other of said words is expected to occur at least as frequently as at least one of said n expected words, means for changing said other of said words in said received plurality to be said at least one of said n expected words, and means for applying the resulting plurality of words to said coder.

11. The invention of claim 10 wherein said changing means performs said changing in such a way that the $i^{th}$ most-frequently-occurring word of said resulting plurality is the same as the expected $i^{th}$ most-frequently-occurring one of said n expected words for $i = 1, \ldots, n$.

12. The invention of claims 10 or 11 wherein said first type of image signal is a signal representing a substantially bilevel image.

13. The invention of claim 12 wherein said first type of image signal is a run-length-coded signal.

14. The invention of claim 12 wherein said second type of image signal is a signal comprised of a plurality of words representing an image that has at least a first multilevel portion.

15. The invention of claim 14 wherein said second type of image signal is a differential pulse code modulated signal.

16. Apparatus for use in conjunction with a coder which assigns a word from a variable length code to each of a plurality of applied words, said variable length code having been optimized for a first set of order statistics, said apparatus comprising, means for receiving a plurality of words which have a second set of order statistics, means for changing at least ones of the words in said received plurality such that, for at least one value of n, the n most-frequently-occurring words in the resulting plurality of words substantially have said first set of order statistics, and means for applying said resulting plurality of words to said coder.

17. The invention of claim 16 wherein said variable length code is optimized for the order statistics of words derived from a first predetermined type of image signal and wherein said received plurality of words is derived from a second predetermined type of image signal.

18. A system comprising
a variable length coder,
means for applying to said coder a run-length-coded signal comprised of first and second pluralities of words which represent lengths of runs of 0s and 1s, respectively, said coder assigning, for at least one value of n, one of the n shortest words of a first variable length code to each of said first plurality words which represents one of a first predetermined plurality of run lengths and assigning, for at least one value of n, one of the n shortest words of a second variable length code to each of said second plurality words which represents one of a second predetermined plurality of run lengths, and means for receiving a signal comprised of runs of 0s and 1s which have an expected frequency of occurrence, the n run lengths that are expected to occur most frequently for runs of 0s being different from said first predetermined plurality of run lengths and the n run lengths that are expected to occur most frequently for runs of 1s being different from said second predetermined plurality of run lengths, said applying means including means for generating as said run-length-coded signal a run-length-coded version of said received signal in which each of the runs of 0s in said received signal whose lengths are among said n run lengths for runs of 0s is represented by one of said first predetermined plurality of run lengths and in which each of the runs of 1s in said received signal whose lengths are among said n run lengths for runs of 1s is represented by one of said second predetermined plurality of run lengths.

19. Apparatus comprising,
a coder which utilizes at least a first code set that is optimized for an assumed frequency of occurrence of at least predetermined ones of a stream words to be coded by said coder, means for receiving a stream of words in which, for at least one value of n, the n most-frequently-occurring words in said received stream are different from the assumed n most-frequently-occurring words, means for changing at least ones of the words in said received stream in such a way that the n most-frequently-occurring words in the resulting stream are the same as said assumed n most-frequently-occurring words, and means for applying said resulting stream to said coder.

20. The invention of claim 19 wherein said code set is a set of variable length code words.

21. Apparatus comprising,
a coder which utilizes at least a first code set that is optimized for an expected frequency of occurrence of at least predetermined ones of the words of a first type of image signal, means for receiving a plurality of words representing a second type of image signal in which, for at least one value of n, the n most-frequently-occurring words in said received plurality are different from the words that are expected to be the n most-frequently-occurring, means for changing at least ones of the words in said received plurality in such a way that the n most-frequently-occurring words in the resulting plurality are the same as said words that are expected to be the n most-frequently-occurring, and means for applying said resulting plurality to said coder.

22. The invention of claim 21 wherein said first type of image signal is a signal representing a substantially bilevel image.

23. The invention of claim 22 wherein said first type of image signal is a run-length-coded signal.

24. The invention of claim 22 wherein said second type of image signal is a signal comprised of a plurality of words representing an image that has at least a first multilevel portion.

25. The invention of claim 24 wherein said second type of image signal is a differential pulse code modulated signal.

26. Apparatus comprising,
a coder which assigns for runs of 1s is represented by one of said second predetermined sets, a word from a variable length code to each of a plurality of applied words, said variable length code having been optimized for a first set of order statistics, means for receiving a plurality of words which have a second set of order statistics, means for changing at least ones of the words in said received plurality such that, for at least one value of n, the n most-frequently-occurring words in the resulting plurality of words substantially have said first set of order statistics, and means for applying said resulting plurality of words to said coder.

27. The invention of claim 26 wherein said variable length code is optimized for the order statistics of words derived from a first predetermined type of image signal and wherein said received plurality of words is derived from a second predetermined type of image signal.

28. A method for use in conjunction with a coder which utilizes at least a first code set that is optimized for an assumed frequency of occurrence of at least predetermined ones of a stream of words to be coded by said coder, said method comprising the steps of, receiving a stream of words in which, for at least one value of n, the n most-frequently-occurring words in said received stream are different from the assumed n most-frequently-occurring words, changing at least ones of the words in said received stream in such a way that the n most-frequently-occurring words in the resulting stream are the same as said assumed n most-frequently-occurring words, and applying said resulting stream to said coder.

29. The invention of claim 28 wherein said code set is a set of variable length code words.

30. A method for use in conjunction with a coder which utilizes at least a first code set that is optimized for an expected frequency of occurrence of at least predetermined ones of the words of a first type of image signal, said method comprising the steps of, receiving a plurality of words representing a second type of image signal in which, for at least one value of n, the n most-frequently-occurring words in said received plurality are different from the words that are expected to be the n most-frequently-occurring, changing at least ones of the words in said received plurality in such a way that the n most-frequently-occurring words in the resulting plurality are the same as said words that are expected to be the n most-frequently-occurring, and applying said resulting plurality to said coder.

31. The invention of claim 30 wherein said first type of image signal is a signal representing a substantially bilevel image.

32. The invention of claim 31 wherein said first type of image signal is a run-length-coded signal.

33. The invention of claim 31 wherein said second type of image signal is a signal comprised of a plurality of words representing an image that has at least a first multilevel portion.

34. The invention of claim 33 wherein said second type of image signal is a differential pulse code modulated signal.

35. A method for use in conjunction with a coder which assigns a word from a variable length code to each of a plurality of applied words, said variable length code having been optimized for a first set of order statistics, said method comprising the steps of, receiving a plurality of words which have a second set of order statistics, changing at least ones of the words in said received plurality such that, for at least one value of n, the n most-frequently-occurring words in the resulting plurality of words substantially have said first set of order statistics, and applying said resulting plurality of words to said coder.

36. The invention of claim 35 wherein said variable length code is optimized for the order statistics of words derived from a first predetermined type of image signal and wherein said received plurality of words is derived from a second predetermined type of image signal.

* * * * *